March 11, 1941.　　　C. E. REED　　　2,234,197
EARTH BORING APPARATUS
Filed Dec. 13, 1938　　　6 Sheets-Sheet 1

Inventor:
Clarence E. Reed,
By Spear, Donaldson & Hull
Attorneys.

March 11, 1941.   C. E. REED   2,234,197
EARTH BORING APPARATUS
Filed Dec. 13, 1938   6 Sheets-Sheet 2
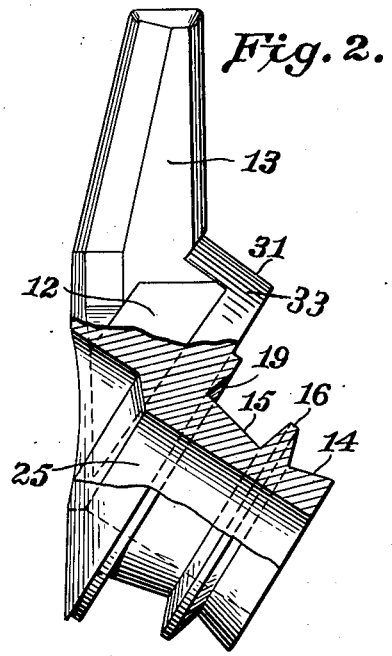
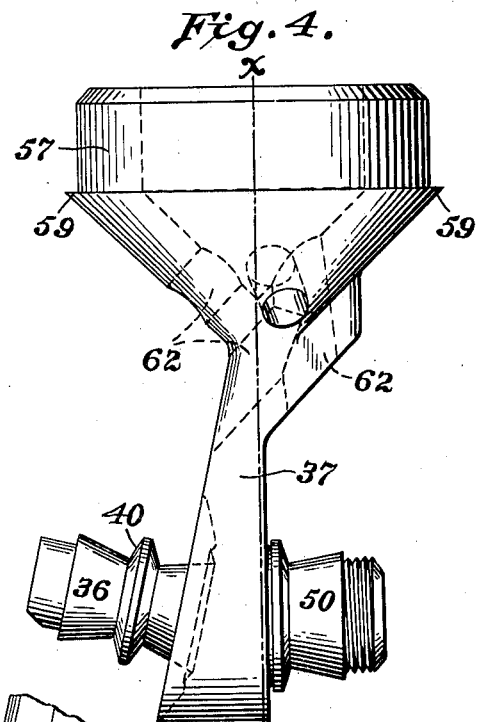
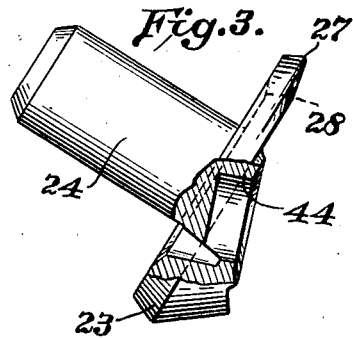
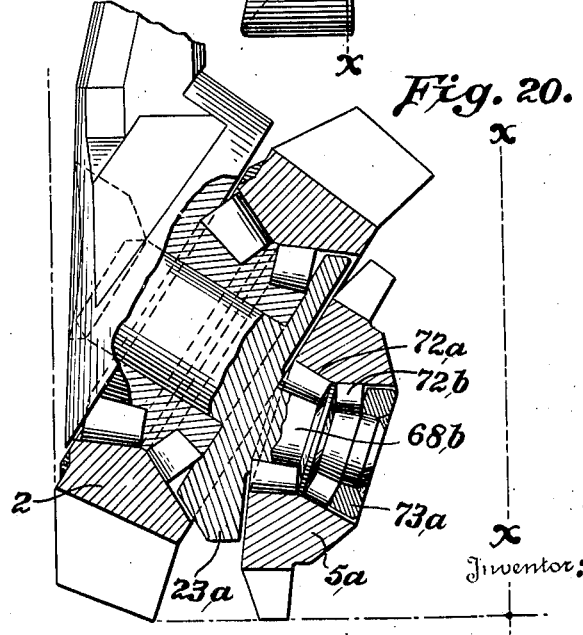
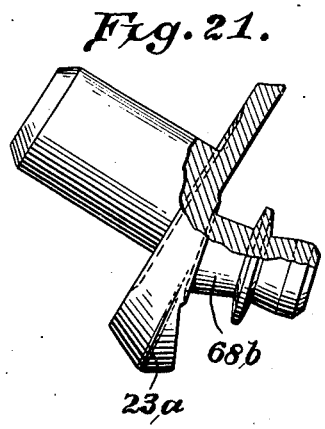
Inventor:
Clarence E. Reed,
By Spear, Tomlinson & Hull
Attorneys March 11, 1941.  C. E. REED  2,234,197
EARTH BORING APPARATUS
Filed Dec. 13, 1938  6 Sheets-Sheet 3
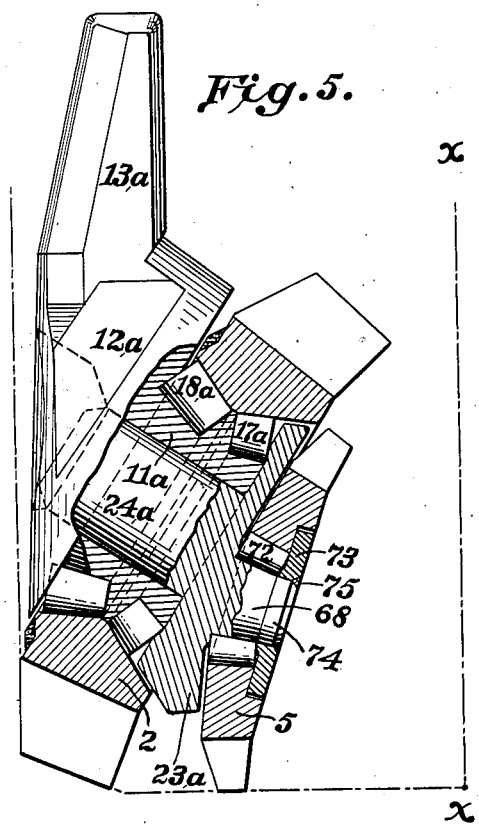
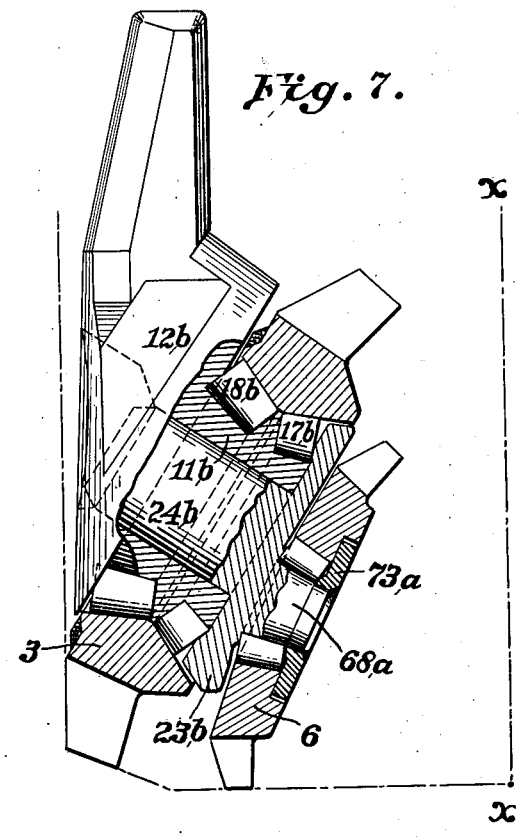
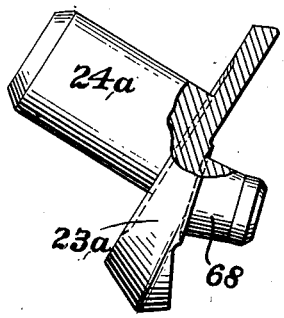
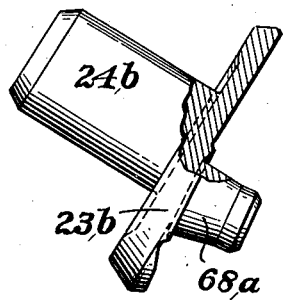
Inventor:
Clarence E. Reed, March 11, 1941.  C. E. REED  2,234,197
EARTH BORING APPARATUS
Filed Dec. 13, 1938  6 Sheets-Sheet 4

Inventor:
Clarence E. Reed,
By Spear, Donaldson & Hull
Attorneys.

March 11, 1941.   C. E. REED   2,234,197
EARTH BORING APPARATUS
Filed Dec. 13, 1938   6 Sheets-Sheet 5

Inventor:
Clarence E. Reed,
By Spear, Donaldson & Hall
Attorneys.

Inventor:
Clarence E. Reed,
By Spear, Donaldson & Hull
Attorneys

Patented Mar. 11, 1941

2,234,197

UNITED STATES PATENT OFFICE 2,234,197

EARTH BORING APPARATUS

Clarence E. Reed, Wichita, Kans., assignor to Chicago Pneumatic Tool Company, New York, N. Y., a corporation of New Jersey Application December 13, 1938, Serial No. 245,507

17 Claims. (Cl. 255—71)

This invention relates to earth boring tools having rotary cutters which disintegrate the material to be removed at the bottom of a bore hole.

Such tools may include a plurality of independently rotatable cutters which separately act upon the bottom of the hole. The tool of the present invention so arranges such independently rotatable cutters that the entire area of the bottom is cut, and that the work of cutting is uniformly distributed about the under side of the bit head. This results in rapid progress in cutting and produces a straight hole.

The invention further provides bearing means for rotatably mounting the several cutters and novel supports for the cutters and their bearings.

Other features of the invention will hereinafter appear.

In the drawings, illustrating several embodiments of the invention:

Fig. 2 is an elevation of the carrier for the largest side cutter;

Fig. 3 is an elevation of the flanged member to be inserted in the part of Fig. 2;

Fig. 4 is an elevation of the central hanger;

Fig. 5 is an elevation of one of the other side cutter assemblies, the cutters being in section;

Fig. 6 is an elevation of the support for the small cutter of Fig. 5;

Fig. 7 is an elevation of the third one of the side cutter assemblies, the cutters being in section;

Fig. 8 is an elevation of the support for the small cutter of Fig. 7;

Fig. 20 is an elevation of a modified arrangement corresponding to either Fig. 5 or Fig. 7;

Fig. 21 is an elevation of the support for the inner cutter of Fig. 20.

Figure 1:
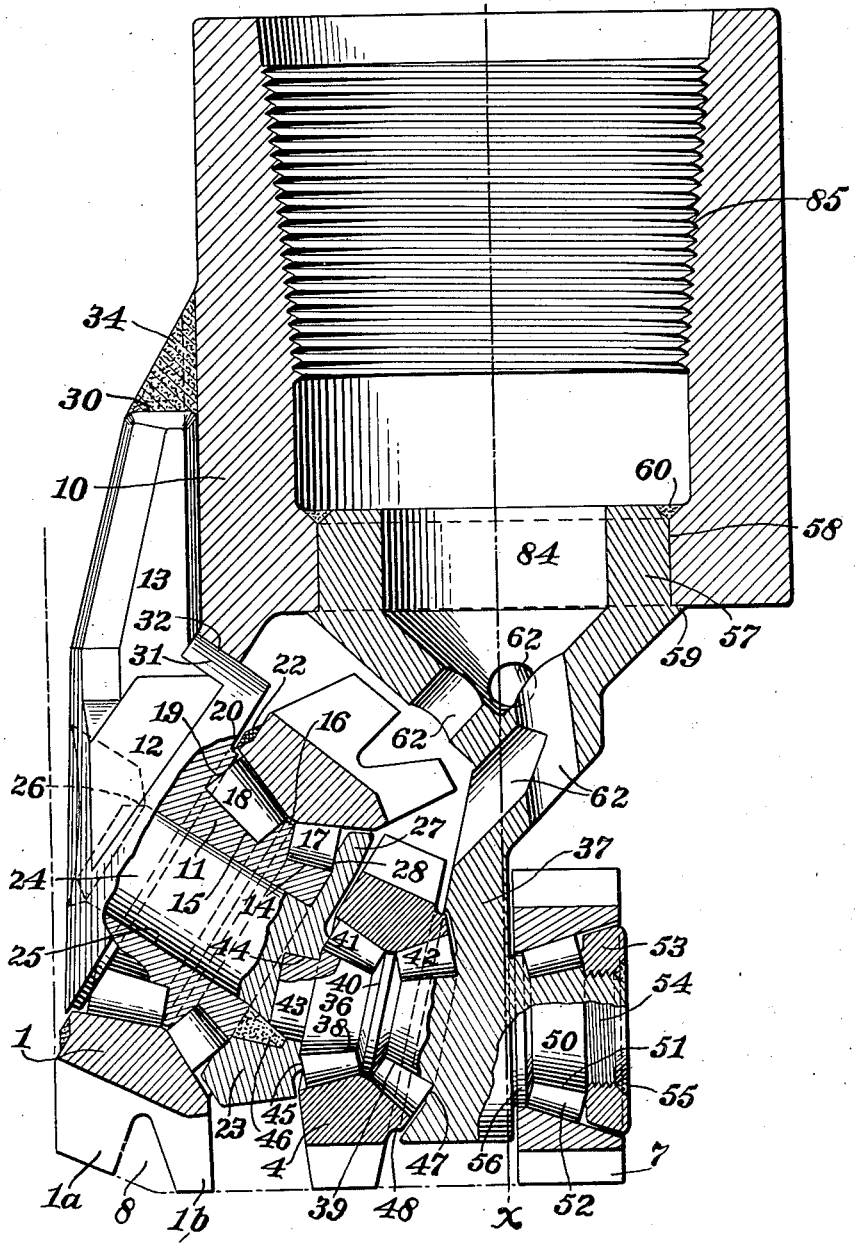
Figure 1 is a section through the axis of a drill embodying a preferred arrangement, the section passing through the central cutter and the largest side cutter, but the cutters to the right of the drill axis and beyond the plane of the section being omitted.

Referring first to the embodiment of the invention illustrated in Figs. 1 to 9 inclusive, the drill includes three side cutters 1, 2, and 3, intermediate cutters 4, 5, and 6, one of which is in side-to-side relation to each of the side cutters, and a central cutter 7 which cuts the area at the bit head axis.

The side cutter 1 is the largest one of the side cutters in thickness of measurement. The teeth on its periphery extend in the direction of the axis of the cutter and are of the general shape of the teeth disclosed in Reissue 15,126 of C. E. Reed, dated June 14, 1921. The teeth of cutter 1 form a base portion 1a, and, separated therefrom by a deep notch 8, an inner portion 1b. The teeth of portion 1a cut an annular area at the side of the hole including clearance for the bit head 10, and this area is inclined to the horizontal. The teeth of portion 1b cut an annular area slightly inwardly from the area cut by the teeth of portion 1a, and this area is generally in a horizontal plane. The axis of rotation of cutter 1 lies in a radial plane of the bit head.

The cutter 4, which is in side-to-side relation to side cutter 1 is disposed with its axis of rotation offset below and at an acute angle to the axis of rotation of cutter 1, but in the same radial plane in which the axis of rotation of cutter 1 lies. The teeth of cutter 4 extend axially thereof and cut an annular area which is between the bit head axis x—x and the area cut by teeth 1b. This area cut by cutter 4 is in the same horizontal plane as the area cut by teth 1b. Due to the angular relation between their axes, cutters 1 and 4 converge upwardly within the bit head, but since cutter 4 is of smaller diameter, and is located lower in the bit head than cutter 1, there is no interference between the top portions of cutters 1 and 4, as appears from Fig. 1.

Cutter 7 is located on the opposite side of the bit head axis from cutters 1 and 4, and one side thereof is close to the bit head axis, so that a central area of the hole will be cut thereby. The axis of rotation of cutter 7 lies in the same plane through the bit head axis in which lie the axes of cutters 1 and 4, but the axis of cutter 7 is perpendicular to the bit head axis. The periphery of cutter 7 is cylindrical, and the area cut by its teeth lies in the horizontal plane of the areas cut by teeth 1b and cutter 4.

The axes of rotation of cutters 2 and 5 lie in the same radial plane of the bit head, and this plane is 120° from the radial plane containing the axes of cutters 1 and 4. As shown in Fig. 5, cutters 2 and 5 have their axes at an acute angle to each other, so that the cutters converge upwardly in the bit head. Cutter 5 is of smaller diameter than cutter 2, and is offset below cutter 2.

The teeth of cutter 2 track the annular area cut by the teeth 1a, and being wider than teeth 1a, extend this inclined annular area toward the annular area cut by teeth 1b. That is, the inner portion of the teeth on cutter 2 cuts into the area left uncut by the notch 8 between teeth 1a and 1b. The teeth of cutter 2 do not cut up to the area cut by teeth 1b, but leaves uncut a portion at this junction between the inclined area and the flat bottom, which will break off.

The teeth on cutter 5 cut an annular area which is outwardly from the area cut by the teeth of cutter 4, but this annular area does not extend outwardly to the area cut by teeth 1b. This annular area cut by the teeth of cutter 5 lies in the same horizontal plane as the areas cut by teeth 1b, 4, and 7.

The axes of rotation of cutters 3 and 6 lie in a radial plane of the bit head which is 120° from the plane containing the axes of cutters 1 and 4, and therefore the plane of cutters 3 and 6 is likewise 120° from the radial plane containing the axes of cutters 2 and 5. The axes of cutters 3 and 6 are at an acute angle to each other, as appears from Fig. 7, so that these cutters converge upwardly in the bit head. Also, the axis of cutter 6 is offset below the axis of cutter 3, and cutter 6 is smaller in diameter than cutter 3.

The teeth of cutter 3 are slightly less wide than teeth 1a, but track the annular area cut by the teeth 1a, and by the outer portion of the teeth of cutter 2. Thus, the teeth of cutter 3 are not wide enough to cut the area left uncut by the notches 8 of cutter 1, this area being cut only by the inner portion of cutter 2.

The teeth of cutter 6 cut the annular area left uncut between cutters 1b and 5. This area cut by cutter 6 is in the same horizontal plane as the areas cut by teeth 1b, 4, 5, and 7.

Thus, the entire area at the bottom of the hole is cut by the teeth of the several cutters, with the exception of the small area left uncut at the junction of the flat bottom with the inclined side. Due to their uniform distribution about the under side of the bit head, the cutters on one side of the bit head axis tend to balance the cutting performed by the cutters on the opposite side thereof with the result that a straight bore hole will be cut. The cutters 7, 4, 5, 6, and teeth 1b, cut successive outward portions of the hole and form a flat bottom, although, if desired, they may be so disposed as to leave the center of the hole slightly higher. The teeth 1a and those of cutters 2 and 3 cut the inclined area at the side of the hole and by tracking each other effectively disintegrate the large amount of material present at this area.

With the exception of cutter 7, the teeth of all the other cutters define the frustum of conical surfaces, and in every instance the projected apices of these conical surfaces lie on the opposite side of the bit head axis from the cutter itself. Because of this, the teeth exert a twisting effect upon the ground to aid in its disintegration. The teeth of cutter 7 exert a like twisting effect upon the ground, since this cutter is forced to roll in a circle despite its cylindrical shape.

The side cutters 2 and 3 are of the same diameter as the teeth 1a of cutter 1, and these corresponding teeth define the same frusto-conical formation so that they track each other on the same inclined surface at the side of the bore hole. The teeth of cutters 4, 5, and 6 and teeth 1b also define frusto-conical surfaces, although of different diameters, it being only necessary that the teeth of these cutters and teeth 1b extend downwardly so that they cut a flat bottom on the bore hole.

Cutter 1 is mounted for rotation upon a spindle 11 of a carrier 12 having a stem 13 for attachment of the carrier to the bit head. The spindle is inclined from the upwardly extending stem 13 at the proper angle to give cutter 1 its desired inclination with respect to the bit head. The spindle 11 includes a raceway 14 at the terminal end thereof, and a raceway 15 at the supported end thereof, these raceways being separated by a flange 16 toward which the raceways converge.

Conical rollers 17 and 18 are upon the respective raceways 14 and 15, and the internal raceways of cutter 1 bear upon these rollers. The opposing ends of the rollers 17 and 18 bear upon the opposite side faces of flange 16. The ends of rollers 18 at the supported end of the spindle enter an annular recess 19 formed in the carrier. Outwardly from recess 19 is a shoulder 20 which the cutter 1 overlies to form a seal preventing entrance of detritus to the rollers. The cutter may be hardened at 22 to resist wear. At its other end the cutter overlies the periphery of a flange 27 to form a seal.

To retain cutter 1 upon the spindle and roller bearings, a flanged member 23 is provided. The stem 24 of this member enters the bore 25 through spindle 11, and is welded in place at the counterbore 26 in carrier 12. Flange 27 of this member overlies the ends of rollers 17 to retain them on raceway 14, and thus prevent movement of cutter 1 off the spindle. To enable the outer portion of flange 27 to bear upon the ends of rollers 17, the flange is formed with an annular recess 28 which receives the terminal end of spindle 11.

The stem 13 of carrier 12 lies between a pair of downwardly and outwardly extending walls 30 on the exterior of the bit head. The surface 31 of the carrier bears on the bottom of notch 32 of the bit head between walls 30, and the flange 33 of the carrier bears on the inner surface of walls 30, to sustain the upward and outward thrusts of the carrier. Welding at 34 retains the carrier in place. This means for supporting the carrier is disclosed and claimed in C. E. Reed Patent No. 2,058,625 dated Oct. 27, 1936.

Cutter 4 is rotatably mounted upon a spindle 36 which projects laterally and slightly upwardly from the lower portion of a hanger 37. Upon this spindle are formed a raceway 38 at its outer end, and a raceway 39 at its supported end, the raceways being separated by a flange 40. The roller bearings 41 and 42 for cutter 4 are similar in arrangement to the bearings for cutter 1.

Projecting beyond the raceway 38 of spindle 36 is a stem 43 which enters a recess 44 in the flanged end of member 23. The outer surface surrounding the opening to recess 44 is faced at 45 to receive the end thrust of rollers 41 and thereby retain the cutter 4 in place on its spindle. A cavity 46 formed in the member 23 and opening into recess 44 enables the stem 43 to be welded to the flanged member 23.

The raceway 39 of spindle 36 extends into a recess 47 formed in the adjacent face of hanger 37. A projecting portion 48 of cutter 4 enters recess 47 and forms a seal to prevent entrance of detritus to the bearings.

On the side of the lower portion of hanger 37, opposite from spindle 36, is a projecting spindle 50 for rotatably mounting cutter 7. A raceway 51 receives the conical rollers 52 upon which the cutter 7 turns. A ring nut 53 screwed upon the projecting threaded end 54 of spindle 50, and welded at 55, forms an end bearing surface for rollers 52, and thereby retains cutter 7 in place. At one end, cutter 7 overlies ring nut 53, and at its other end overlies a flange 56 formed on the spindle 50, to seal the bearing surfaces.

To secure hanger 37 to the bit head, it is enlarged at its upper end into a cylindrical portion 57 which fits within central opening 58 in the bit head. A flange 59 on the upper portion of the hanger seats against the under side of the bit head to limit the upward movement of the hanger. Welding at 60 retains the hanger in place.

In assembling the cutters 1, 4, and 7 and mounting them in the bit head, the cutter 4 and its rollers must first be placed upon the spindle 36 when the hanger 37 is separated from the bit head. To position cutter 4 on its spindle 36 the rollers 42 are first located about the raceway 39, and the cutter 4 is then placed over them. Rollers 41 are then located in place about raceway 38 and the flanged member 23 is positioned upon the stem 43 of spindle 36. With the flanged member 23 located upon stem 43 in its proper position, the welding in cavity 46 is applied to secure these parts together.

The cutter 1 and its bearings are separately assembled upon the carrier 12, the carrier being apart from the bit head. After locating rollers 18 about raceway 15 the cutter is placed over them and rollers 17 are then located about raceway 14. The stem 24 of flanged member 23 is inserted in the bore 25 of spindle 11, and the welding in counterbore 26 is applied.

The cutters 1 and 4, together with their roller bearings, and the carrier 12 and hanger 37 thus form a sub-assembly which must be put together apart from the bit head. This sub-assembly is then inserted into place in the bit head in a direction axially of the bit head by passing stem 13 of carrier 12 between walls 30 and entering the upper cylindrical portion 57 of hanger 37 in the central opening 58 of the bit head. The welding at 34 and at 60 is then applied.

The cutter 7 may be secured upon its spindle at any time during the formation of the sub-assembly just described. This is accomplished by first placing the cutter on the spindle, then locating the rollers 52 in place and securing ring nut 53 on the threaded end 54. It will be observed that the spindles for cutters 1, 4, and 7 form in effect one spindle extending from the carrier 12 at the side of the bit head inwardly of the drill and supported centrally by hanger 37. Cutter 7 is on the end of this composite spindle across the bit axis from these two supports.

Cutters 2 and 5 are mounted in the bit head by a carrier 12a which is similar in formation to the carrier 12 as to both its stem portion 13a and spindle portion 11a. Rollers 17a and 18a are located between cutter 2 and spindle 11a as are the rollers between cutter 1 and its spindle 11. The flanged member 23a which serves to retain cutter 2 in place on its spindle, differs from flanged member 23 which serves a like purpose for cutter 1, in that a spindle 68 is formed upon the flanged member 23a to mount cutter 5.

The spindle 68 projects from the side of the flange member 23a, opposite to that from which stem 24a projects and the axis of spindle 68 is properly offset from and at an angle to the axis of stem 24a to establish the desired relation between cutters 2 and 5. Stem 24a enters the bore through spindle 11a and these parts may be welded in place.

Rollers 72 are first located about spindle 68 and then cutter 5 is positioned in place. A ring or collar 73 is placed upon the projecting cylindrical end 74 of spindle 68 and welding at 75 retains it in place. The collar 73 projects beyond the ends of rollers 72 and lies within a recess in the face of the cutter.

Cutters 3 and 6 are mounted in a manner similar to the mounting of cutters 2 and 5. Cutter 3 rotates upon bearings 17b and 18b on spindle 11b of carrier 12b. The flanged member 23b retains cutter 3 in place and provides a spindle 68a upon which cutter 6 is rotatably carried. The offset and angular relation between the axis of spindle 68a and stem 24b of member 23b is such as to establish the correct relationship between the cutters 3 and 6. A comparison of Fig. 6 with Fig. 8 shows the difference between the offset and angular relation between the stem and spindle of member 23b, and this relation between the stem and spindle of member 23a.

The cutters 3 and 6 are assembled in the same manner that cutters 2 and 4 are assembled. Cutter 6 is retained upon spindle 68a by a ring or collar 73a welded to the end thereof.

The carrier 12a with cutters 2 and 5 and the carrier 12b with cutters 3 and 6 are inserted in the bit head before the sub-assembly, made up of carrier 12, hanger 37, and cutters 1, 4, 7, is secured in the bit head. This is necessary because cutters 2 and 5 and 3 and 6 could not be positioned in place past cutter 7 if the latter were in place first.

To convey flushing fluid to the several cutters, the upper portion of hanger 37 is formed with a plurality of ports 62 which direct the fluid upon the cutters. A central recess 84 in the cylindrical portion 57 of the hanger opens into the bore of the bit head and receives flushing fluid from the drill pipe (not shown) which is threaded into the bit head at 85.

The modified arrangement of Figs. 10 to 15 relates to the sub-assembly of cutters including the largest side cutter $1x$. This cutter $1x$ as well as cutter $4x$ may be the same as cutters 1 and 4 respectively of Fig. 1. Cutter $1x$ is mounted upon rollers $17x$ and $18x$ which rotate upon raceways of spindle $11x$. Spindle $11x$ projects from carrier $12x$ which is of the same construction as carrier 12 of Fig. 1. Retaining the cutter $1x$ in place is a flanged member $23x$ having a stem $24x$ which enters the bore through spindle $11x$.

Opposite from stem $24x$ of the flanged member $23x$ projects a spindle $36x$ for mounting cutter $4x$. Spindle $36x$ is provided with raceways for roller bearings $41x$ and $42x$ and this bearing arrangement in this respect is similar to that for cutter 4. Beyond the raceway for bearing 42x, the spindle 36x has a stem 97 which seats in a recess 98 of a spindle member 99. When assembled, the spindle member 99 provides an end abutment for the roller bearings 42x and thereby retains 4x in place.

Spindle member 99 seats in the lower forked end 37a of a central hanger 37x the upper stem portion 57x of which enters a recess 58x in a cross plate of the bit head. Welding at 60x retains the hanger in place in the bit head and welding between the spindle member 99 and the hanger at its forked end 37a retains these parts in position.

A spindle 50x projecting from member 99 rotatably mounts cutter 7x so that this cutter occupies the position of cutter 7 of Fig. 1. However, the bearing for cutter 7x is somewhat different inasmuch as the spindle 50x provides two raceways 51a and 51b separated by a flange 50y. The conical rollers 52x and 52y bear on raceways 51a and 51b respectively and a collar or ring 114 fastened by welding upon the projecting end of spindle 50x retains the bearings 52y and thereby the cutter 7x in place.

Figure 9:
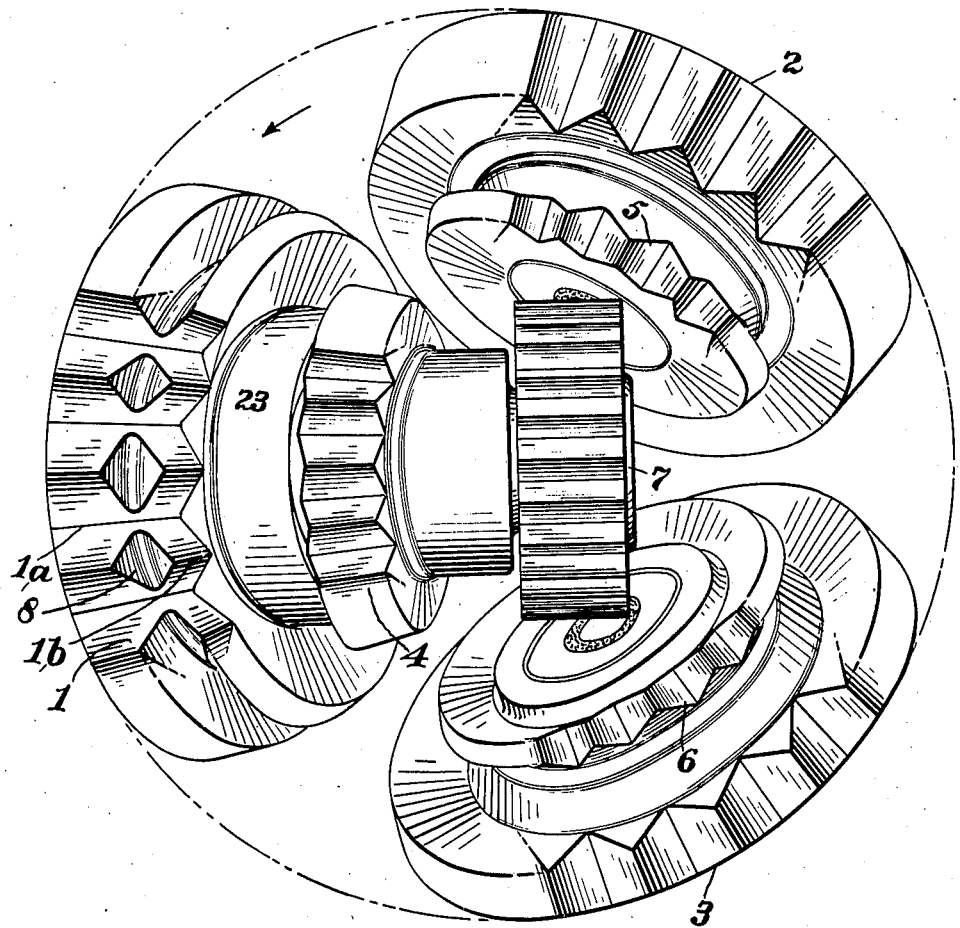
Fig. 9 is a bottom plan view of Fig. 1.

A complete drill utilizing the assembly of cutters 1x, 4x, and 7x, would also include cutter assemblies such as 2 and 5, and 3 and 6, arranged as in Fig. 9, so that the entire bottom of the hole will be acted upon. In such a drill, the cutters corresponding to 2 and 5, and 3 and 6, would first be located in the bit head, after which the sub-assembly made up of cutters 1x, 4x, and 7x would be secured in the bit head.

Figure 10:
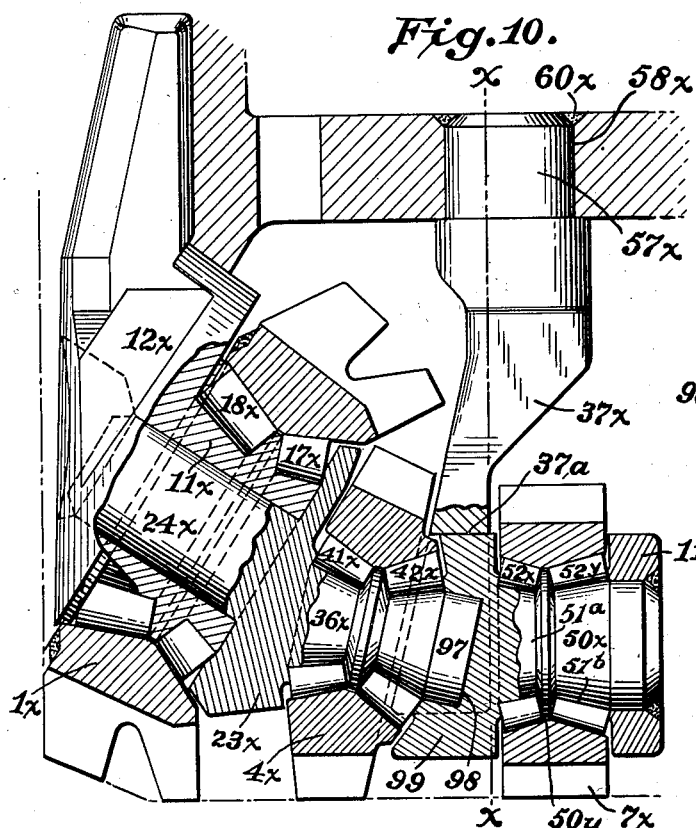
Fig. 10 is a section through the axis of the lower portion of a drill having a modified arrangement for supporting the largest side cutter and the cutters associated therewith.
Figure 11:
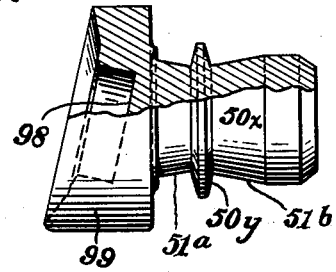
Fig. 11 is an elevation partly in section of the support for the cylindrical cutter of Fig. 10.
Figure 15:
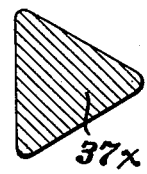
Fig. 15 is a section on the line 15—15 of Fig. 13.
Figures 13, 14:
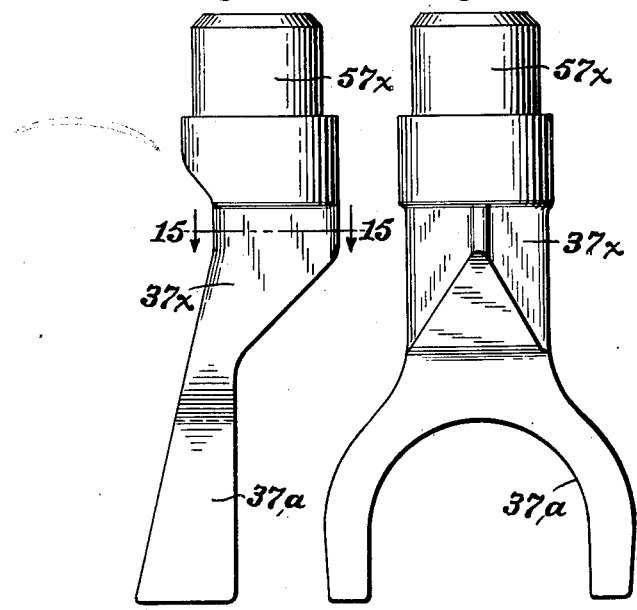
Fig. 13 is an elevation of the central hanger of Fig. 10.
Fig. 14 is a side elevation of Fig. 13.
Figure 12:
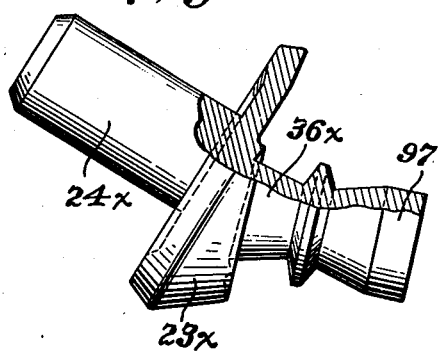
Fig. 12 is an elevation partly in section of the support for the intermediate cutter of Fig. 10.
Figure 16:
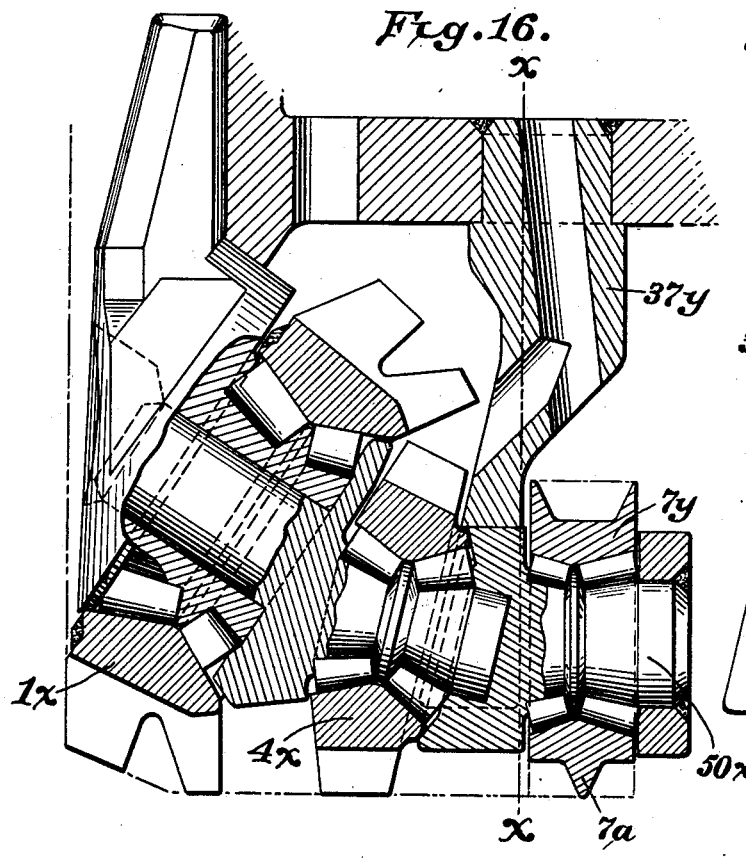
Fig. 16 is a section through the axis of a lower portion of a drill embodying another modified arrangement of the largest side cutter and associated cutters, and their supporting means.
Figure 17:
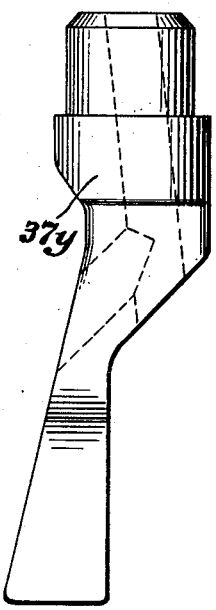
Fig. 17 is an elevation of the central hanger of Fig. 16.
Figure 18:
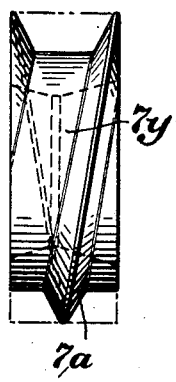
Fig. 18 is an elevation of the cylindrical cutter 5 of Fig. 16.
Figure 19:
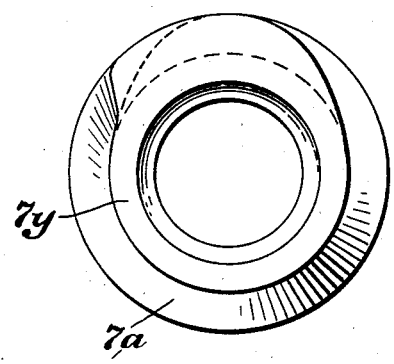
Fig. 19 is a side elevation of Fig. 18.

The embodiment of the invention illustrated in Figs. 16 to 19 is similar to the arrangement in Fig. 10, with the exception that the cutter 7y operating at the center of the hole has teeth 7a which lie in a spiral about the cutter, instead of the lengthwise teeth on cutter 7x. The pitch of the spiral so defined by the teeth is such that it forms a complete turn around the cutter.

Cutter 7y is mounted upon spindle 50x in the same manner as is cutter 7x, and this spindle, in turn, is supported by a hanger 37y, like in Fig. 10. Hanger 37y may be provided with port holes to convey flushing fluid to the cutters, as shown. Cutters 7x and 4x correspond to cutters of Fig. 10, and are similarly mounted.

Figs. 20 and 21 illustrate an arrangement which may be utilized for either the assembly of cutters 2 and 5, or the assembly of cutters 3 and 6. The cutter shown corresponds to cutter 2 of Fig. 5 and is mounted upon rollers and the spindle 11 of a carrier corresponding to the carrier for cutter 2. A flanged member 23a retains the cutter 2 in place but the spindle 68b projecting from member 23a is sufficiently long to provide raceways for rollers 72a and 72b. The cutter 5a has a toothed formation similar to cutter 5, but the body portion of the cutter is elongated to form a hub portion which will accommodate the said rollers 72b as well as the rollers 72a and the retaining ring or collar 73a. If desired, the cutter 6 may be mounted in the same manner as is cutter 5a.

It is to be understood that a detail, or details, illustrated in one embodiment of the invention may be substituted for the corresponding arrangement disclosed in another embodiment of the invention, and such substitutions are to be considered as herein disclosed. For example, instead of the bearing arrangement shown for cutter 7 in Fig. 1, the bearing arrangement for cutter 7x of Fig. 10 may be employed for the cutter acting at the center of the hole. Or, cutter 4 in Fig. 1 may be mounted upon a spindle which is integral with the flanged member 23, so that the arrangement of Fig. 10 will be present. Other substitution will be apparent. It is intended that the claims shall include such variations and others to which the invention is susceptible.

I claim:

1. An earth boring tool comprising three side cutters tracking an annular area at the side of a bore hole, three independently rotatable cutters positioned in side by side relation with said side cutters respectively on an axis at an acute angle to the axis of its associated side cutter, and another cutter adjacent the center of the drill bit cutter assembly, all cutters inwardly of the side cutters operating in cutting planes defining substantially a flat bottomed bore hole inwardly of said annular area.

2. An earth boring drill having two cutter units spaced 120° apart about the drill axis, each of said units comprising a spindle having a free end and a roller cutter rotatably mounted on the spindle, said cutters being substantially equidistant from the axis of rotation of the drill bit so that they track each other, and a third cutter unit spaced 120° apart from the units first mentioned and including a spindle and a roller cutter rotatably mounted thereon which is outwardly from the drill axis equidistant to the first mentioned cutters so as to track them, means for supporting the spindle of the third cutter unit at its outer end and means for supporting its inner end on the same side of the drill axis.

3. An earth boring drill having two cutter units spaced 120° apart about the drill axis, each of said units comprising a spindle having a free end and a roller cutter rotatably mounted on the spindle, said cutters being substantially equidistant from the axis of rotation of the drill bit so they track each other, and a third cutter unit including a spindle which is spaced 120° apart from the two units first mentioned and which has a portion which projects across the drill axis, said third cutter unit including upon its spindle a roller cutter which is located outwardly from the drill axis equidistant to the first mentioned cutters so as to track them, and another roller cutter which is positioned adjacent the drill axis and upon said portion of the spindle of the third cutter unit which projects across the drill axis.

4. An earth boring drill having two cutter units spaced 120° apart about the drill axis, each of said units comprising a spindle having a free end and a roller cutter rotatably mounted on the spindle, said cutters being substantially equidistant from the axis of rotation of the drill bit so that they track each other and having their cutting edges at an acute angle to the drill axis so they operate upon an inwardly and downwardly inclined, relatively narrow, annular area at the side wall, and a third cutter unit spaced 120° apart from the units first mentioned and including a spindle having a support for its outer end and a support for its inner end, said last named spindle being composed of a plurality of sections or portions having axes inclined to each other, and roller cutters rotatably mounted upon said sections and having their cutting teeth disposed substantially perpendicular to the drill axis for cutting a substantially flat bottomed bore hole inwardly from said inclined annular area at the side of the hole.

5. A drill bit comprising three cutters, one of which is a side cutter, having axes in the same vertical plane, disintegrating spaced annular paths or areas, and two other cutters having their axes in different vertical planes and disintegrating annular areas between the paths of two of the three cutters, and two other side cutters.

6. A drill bit comprising three side cutters, each having a row of teeth, the edges of said teeth being of different lengths, tracking each other over a narrow annular area at the side wall of a bore hole, said annular area inclining downwardly and inwardly, one of said three side cutters having another row of teeth positioned for distintegrating an annular area next inwardly from said first mentioned annular area and in a plane inclined thereto, and cutters, other than said side cutters having cutting surfaces overlying annular paths progressively inwardly to and including the axis of the bit and in substantially the same plane of cutting as said another row of teeth.

7. A drill bit comprising three side cutters having radial teeth positioned to travel over annular paths at the side wall of the hole, a fourth cutter having teeth arranged in a spiral row and positioned to travel over a path near the center of the bore hole, and two other cutters each having one row of relatively narrow teeth and positioned to travel over annular paths, intermediate the paths of the fourth cutter and the three side cutters.

8. A roller boring drill comprising a plurality of independently rotatable cutters, the axes of all of which are distributed in three planes passing through the bit head axis, each of said planes containing the axes of at least two cutters and the axes therein being at an acute angle with respect to each other.

9. A roller boring drill comprising a plurality of independently rotatable cutters, the axes of all of which are distributed in three planes passing through the bit head axis, one of said planes containing the axes of three cutters and the other two planes containing the axes of two cutters, the axes in any one plane being at an acute angle to each other, one of the three cutters which have their axes in a common plane being on the opposite side of the bit head axis from the other two of said three cutters.

10. An earth boring drill comprising a bit head, a plurality of recesses in said bit head spaced approximately 120 degrees apart, three carriers associated with the respective recesses, cutter means supported by each of said carriers, each of the carriers being attachable to and detachable from the bit head by unitary movement with its associated cutter means in a direction parallel to the bit axis, the cutter means associated with one of the carriers comprising a plurality of independently rotatable cutters, said one carrier being movable into and out of position in its associated recess independently at the other carriers.

11. An earth boring drill according to claim 10 in which said one carrier supports the outer end of a sectional spindle made up of sections out of axial alinement for supporting said independently rotatable cutters, the inner end of the inner spindle section being free or unsupported to permit the attachment thereto and the detachment therefrom of one of the independently rotatable cutters.

12. An earth boring drill comprising a bit head, a plurality of recesses in said bit head spaced approximately 120 degrees apart, three carriers associated with the respective recesses, cutter means supported by each of said carriers, each of the carriers being attachable to and detachable from the bit head by unitary movement with its associated cutter means in a direction parallel to the bit axis, the cutter means associated with one of the carriers comprising a plurality of independently rotatable cutters out of axial alinement with each other, each carrier being movable into and out of position in its associated recess independently of the other carriers.

13. An earth boring drill comprising a bit head having at its lower end three peripheral recesses spaced approximately 120 degrees apart and also having a central recess, three carriers supported in the peripheral recesses, a carrier member supported in the central recess, said carrier member and each of said carriers being movable in a direction parallel to the bit axis for attachment to or detachment from its respective recess, three spindle members each of which is supported at its outer end by one of the carriers, one of the spindle members being supported also at its inner end by the central carrier member, the other two spindle members being unsupported at their inner ends to permit attachment and detachment of said one spindle member and associated carrier and carrier member with relation to the bit head independently of the spindle members supported by the other carriers.

14. An earth boring drill comprising a plurality of rotary cutters having their axes disposed in three diametrical planes through the drill axis, one being a central cutter adjacent the drill axis for cutting a circular area at the center of the hole bottom, and the other cutters including rows of teeth on said cutters and located outermost of the drill to track each other over an annular area at the side of the hole as the drill is rotated, and which are carried by cutters in each of said three planes, and said other cutters also including other rows of teeth on said cutters and which are located at different distances from the drill axis so that they do not track each other but together will cut the area between the area cut by said central cutter and the area cut by said tracking rows of teeth, said other rows of teeth being upon cutters whose axes are in all of said three planes.

15. An earth boring drill comprising a plurality of rotary cutters having their axes disposed in three diametrical planes through the drill axis, one being a central cutter adjacent the drill axis and having teeth with cutting edges disposed substantially at right angles to the drill axis for cutting a circular area on a horizontal plane at the center of the hole bottom, and the other cutters including rows of teeth on said cutters and located outermost of the drill and having their cutting edges disposed at an acute angle to the drill axis to track each other over a downwardly and inwardly inclined area at the side of the hole as the drill is rotated, and which are carried by cutters in each of said three planes, and said other cutters also including other rows of teeth on said cutters having their cutting edges disposed substantially at right angles to the drill axis and located inwardly of each of said tracking rows of teeth but at different inward distances so that they do not track each other but together will cut the area between said circular and said inclined areas and upon the same horizontal plane as said circular area, said other rows of teeth being upon cutters whose axes are in all of said three planes.

16. A side roller cutter for an earth boring drill having a bore extending through said cutter from end to end and a cutting surface comprising a single row of teeth having edges disposed approximately parallel with the cutter axis, and separated therefrom by a relatively wide groove, a single other row of narrow teeth having edges which incline toward the cutter axis and define a frustum of a cone, said other row of narrow teeth being positioned at the plane bounding the inner end face of said cutter and overhanging the end of said cutter bore.

17. In combination in an earth boring drill an inclined annular side cutter recessed at its inner face, another cutter having a portion projecting within said recess and having cutting teeth, the edges of which are in planes of operation approximately at right angle to the drill axis, spindles for said cutters, rolling end thrust bearings and rolling radial bearings for said cutters, and shoulders on said spindles for said cutters and said bearings.

CLARENCE E. REED.